United States Patent Office 3,055,474
Patented Sept. 25, 1962

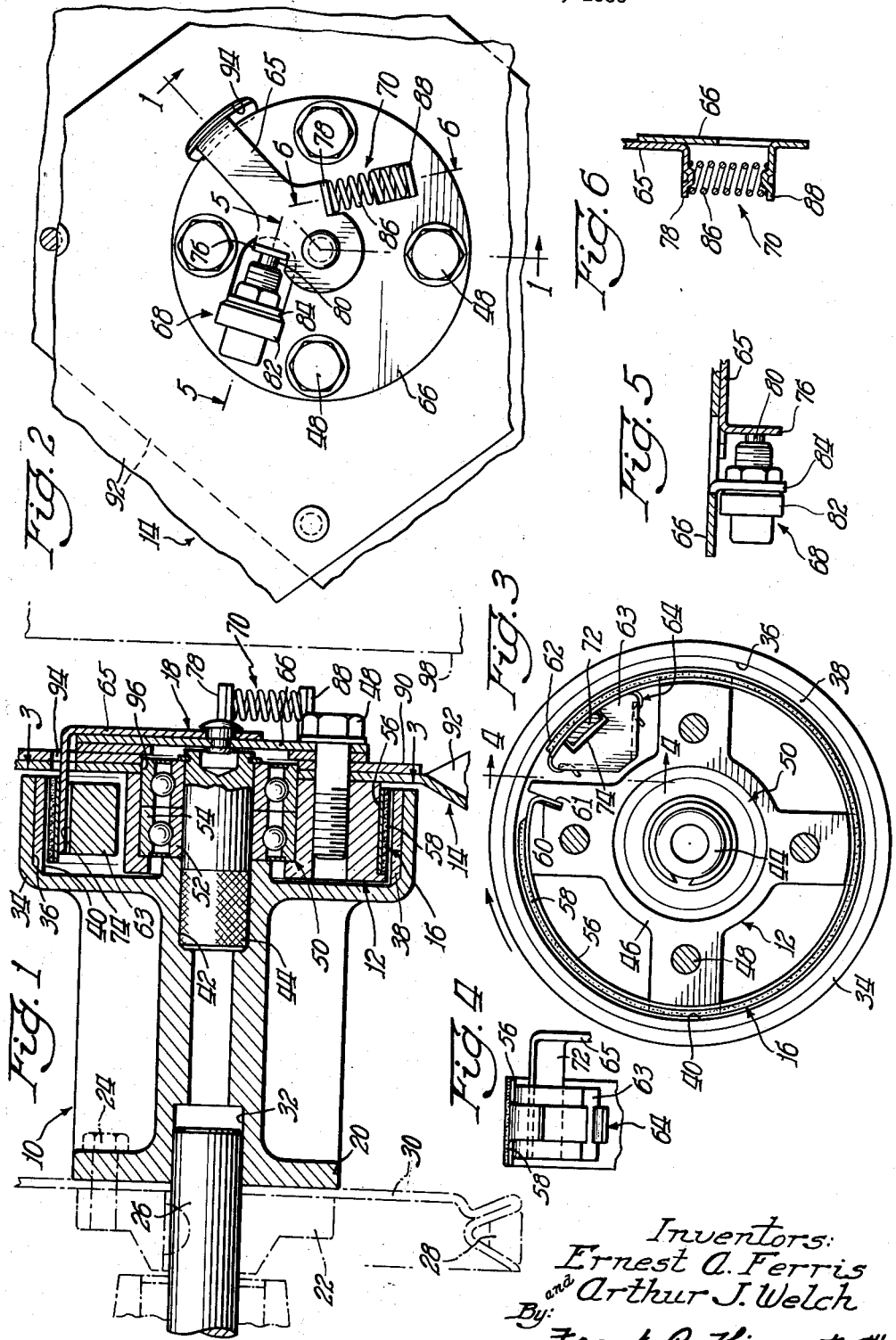

3,055,474
THERMOSTATICALLY CONTROLLED CLUTCH
Ernest A. Ferris, Downers Grove, and Arthur J. Welch, Oak Park, Ill., assignors to Borg-Warner Corporation, Chicago, Ill., a corporation of Illinois
Filed Dec. 31, 1959, Ser. No. 863,135
5 Claims. (Cl. 192—82)

This invention relates to clutch devices and more particularly, to clutch devices responsive to ambient temperature conditions and particularly suited for controlling the engagement between a driving means and a driven device such, for example, as a fan.

It is an object of the present invention to provide a clutch mechanism for engaging and disengaging a fan device in response to engine temperatures.

It is a further object to provide a simple and inexpensive clutch device of the friction band type for engaging a fan device with a driving means at a predetermined temperature of the air surrounding such clutch device.

Another object is to provide an improved thermally actuated clutch device wherein the thermally responsive means for effecting engagement of the clutch device is mounted on the driven member.

It is a further object to provide an improved clutch device wherein a thermally responsive device mounted on the driven member is used to effect engagement and a separate biasing means also mounted on the driven member is used to effect disengagement.

A still further object of this invention is to provide a clutch device having improved lock-up and quick release characteristics.

Other objects and features of the invention will be readily apparent to those skilled in the art from the specification and appended drawings illustrating a preferred embodiment of the invention in which:

FIG. 1 is an elevational view in section;
FIG. 2 is a right end view of the device shown;
FIG. 3 is an end sectional view taken along the line 3—3 of FIG. 1;
FIG. 4 is a sectional view taken along the line 4—4 of FIG. 3;
FIG. 5 is a view of the thermally responsive unit partially in section taken along the line 5—5 of FIG. 2; and
FIG. 6 is a view of the biasing means partially in section taken along the line 6—6 of FIG. 2.

The device shown in FIG. 1 and constructed in accordance with the principles of the invention comprises generally, a driving member 10, a driven member or fan carrier 12 having mounted thereon a fan assembly 14, a clutching element in the nature of an annular friction band 16 and an actuating device 18 for actuating the friction band 16 to accomplish a driving engagement between the driven member 12 and the driving member 10.

The driving member 10 which may be an aluminum casting, for example has formed at its one end a generally annular flange 20 for connection to a complementary annular plate 22 by suitable means such as plurality of bolts 24. The annular plate 22 is fixedly attached to a shaft 26 of a water pump (not shown). The water pump shaft 26 and the water pump attached thereto are adapted to be driven in a conventional manner by a fan belt 28 through a pulley 30, the pulley 30 being bolted to the annular plate 22. The driving member 10 has centrally formed therein an opening 32 to receive the end of the water pump shaft 26. It will be noted that the annular plate 22, the pulley 30 and the flange 20 are bolted together by the bolts 24, the shaft 26 extending through central openings in the plate 22 and the pulley 30 and into the opening 32 of the driving member. Thus the driving member 10 is driven at all times and at the same speed as the water pump shaft 26.

At its right end, as viewed in FIG. 1, there is formed on the driving member 10 a hub or drum 34, the inner annular periphery 36 thereof being lined with a drum liner 38. The inner periphery 40 of the drum liner functions as a clutching surface. The inner periphery 36 of the drum 34 and the outer periphery of the liner 38 may have complementary serrations and projections formed thereon to prevent relative circumferential movement between the drum 34 and the liner 38. Also formed in the driving member 10 is a central opening 42 for receiving a drive shaft 44. The drive shaft 44 may be press fitted, for example, into the central opening 42.

The driven member 12 of this device serves as a fan carrier. The driven member comprises a spider 46 which may be made of cast aluminum, for example. The spider 46 is adapted to receive the fan assembly 14 which may be bolted to the spider by means of a plurality of bolts 48. The spider 46 is journalled for free rotation around the drive shaft 44 by means of a double row of bearings 50 disposed between inner races 52 and outer races 54.

The clutching element 16 comprises an expandable metal band 56 on the outer periphery of which is attached a band of friction material 58. This clutching element may comprise a single wrap band as illustrated in FIG. 3. The friction material 58 may be attached to the metal band 56 by a conventional bonding process. The friction material may be made, for example, from material identified as Gatke brake lining style #2460. On one end of the metal band 56 there is formed a radially inturned portion 60. In an assembled condition, the portion 60 is fitted into a radially extending slot 61 formed in the spider 46. In an assembled condition, (see FIG. 3) the slot 61 serves as an anchor point for the inturned portion 60 of the friction band, the friction band being anchored in such a way that the portion 60 may move only in a substantially radial direction relative to the spider. No substantial circumferential movement with respect to the spider is possible.

The other end 62 of the friction band 16 is loose and may be referred to as the trailing end 62. As viewed in FIG. 3, the driving member 10 will normally rotate in a clockwise direction as indicated by the arrow. It will be noted that the wrap of the friction band 16 is in a counterclockwise direction progressing from the point at which the portion 60 is anchored in the slot 61 of the spider 46. Attached to the trailing end 62 is a weight 63 the purpose of which is hereinafter explained. Clip means 64 forming part of the metal band 56 are used to retain the weight 63 on the trailing end 62.

The actuating device 18, which controls the engagement of the clutching element 16 with the driving member 10 comprises a radially extending lever 65 pivotally mounted at the center of a plate 66 by means such as a rivet, for example, which will allow pivotal movement of the lever in relation to the plate 66. The plate 66 is fixed to the spider 46 together with the fan assembly 14 by means of bolts 48. The actuating device also comprises a thermally responsive unit 68 and a biasing means 70 in the form of a spring, both of which are mounted on the plate 66 and respectively arranged to move the lever 65 in opposite circumferential directions. In the embodiment shown the pivotal axis of the lever 65 is substantially connected with the axes of the driving and driven members. An axially extending tab 72 is formed on the outer end of the lever 65 and is adapted to be connected to the trailing end 62 of the clutching element 16. As illustrated in FIG. 3, the tab 72 is received by a recess 74 formed in the weight 63. This recess 74 together with the inner surface of the metal band 56 forms an opening which is adapted to loosely retain the tab 72. It is obvious that movement of the lever 65 in a clockwise or counterclockwise direction will have the effect of radially expanding or contracting the clutching element 16, the other end of which is anchored in slot 61 of the spider 46.

Axially extending projections 76 and 78 are also formed on the lever 65 and extend in an opposite axial direction from the tab 72. As seen in FIG. 2, the projections 76 and 78 are each radially spaced from the lever pivotal mounting.

The thermally responsive means 68 is of a well known type such, for example, as is produced by the Dole Valve Company. It includes a pin or piston 80 which may be moved outwardly by the expansion of a thermally expansible material within the pressure tight body 82. The body 82 is mounted on the plate 66 by a suitable means such as a bracket 84 which may be a piercing from the plate 66 as shown in FIG. 5.

The biasing means 70 comprises a compression spring 86 mounted between an axially extending projection 88 connected to the plate 66 and the projection 78 formed on the lever 65.

The fan assembly 14 comprises a central flange portion 90 from which may extend a plurality of blades 92. A circumferentially extending slot 94 extending through an arc of approximately 30° for adequate clearance is formed in the flange portion 90. In the assembled device, the tab 72 on the lever 65 extends through the slot 94 and into the opening formed by the recess 74 and the metal band 56. An aperture 96 is centrally formed in the flange portion 90 so that when assembled this aperture fits around the outermost portion of the bearing 50. Thus in an assembled condition, as shown in FIG. 1, the spider 46 which is journalled on the drive shaft 44, the flange portion 90 of the fan assembly 14 and the plate 66 are all secured together by a plurality of bolts 48.

Operation

One of the purposes of this device is to provide a simple mechanism which will permit a fan assembly to remain in a disengaged condition while ambient temperatures are below a certain predetermined figure. When the temperature of the surrounding air rises to a certain predetermined figure, the fan is then to be engaged by the driving member and continued in operation until the temperature of the surrounding air is again reduced to a certain temperature when disengagement of the fan will again be effected.

It will be noted in the operation of this device that the driving member 10 which is connected to the water pump shaft as illustrated in FIG. 1 will at all times be driven along with the water pump shaft by the pulley 30. During this rotation of the driving member 10 the driven member 12 will rotatingly float on the drive shaft 44. There will in all probability be some rotation of the driven member 12 and the fan assembly 14 assembled thereon due to the frictional drag of the bearings 50. It will be noted that while the driven member 12 is not engaged with the driving member 10, there is no power consumption by the driven member, and this, of course, is one of the desirable results sought to be obtained.

A device of this type in an automotive environment would normally be located immediately to the rear of the radiator of a vehicle, a radiator being shown schematically in FIG. 1 at 98. As is well known, in a conventional automobile a coolant circulating through an engine is circulated through a radiator thus heating the radiator and the air which would normally pass through the radiator from the front to the rear and over the engine. Assuming that this device is located immediately to the rear of an automobile radiator as shown in FIG. 1, it is apparent that the temperature surrounding this device will increase with an increase in engine temperature. It is desirable, if possible, that engine temperature be increased to a predetermined amount but that it not exceed a certain upper range. On the other hand, it is also desirable to keep the engine temperature and the temperature of the air surrounding an engine above a certain lower limit to help maintain maximum efficiency. Thus it would be well to dispense with the cooling effects of a constantly rotating fan when the engine temperature and temperature of air flowing over the engine reaches a relatively low value and to have the fan engage to provide a flow of cooling air when the engine temperature is at a relatively higher value. In operation, when the engine temperature increases to a certain predetermined value, the expansible material in the thermally responsive unit 68 will expand and force the piston 80 to the right as seen in FIG. 2 and push against the projection 76 on the lever 65. This causes the lever 65 to move in a clockwise direction as seen in FIG. 2. This clockwise movement of the lever 65 and the tab 72 moves the trailing end 62 of the clutching element 16 circumferentially to the right thereby radially expanding the entire clutching element 16. As soon as the clutching element 16 is expanded sufficiently so that the friction band 58 makes an initial contact with the clutching surface 40 formed on the inner periphery of the drum liner 38, this frictional engagement will cause rotational movement of the driven member 12. As this frictional engagement increases the speed of the driven member increases and is effective to exert a constantly increasing centrifugal force on the clutching element 16. Eventually the self energizing characteristics of the clutch element 16 effect a complete engagement between the clutching element 16 and the clutching surface 40 so that the driven member 12 and the fan assembly 14 attached thereto are rotated at the same speed as the driving member 10. The centrifugal force exerted by the weight 63 attached to the trailing end 62 assists in bringing about a rapid engagement of the friction band with the clutching surface 40 once engagement has begun. It is to be noted that the thermally responsive unit 68 brings about the initial engagement of the clutching element 16 with the clutching surface 40. Once this initial engagement is brought about, the rapid build up of centrifugal force due in part to the weight 63 in the now rotating clutching element 16 brings about a complete and positive engagement betweeen the driving and driven members. It will be noted that the clockwise movement of lever 65 exerts a compressive action on the spring 86.

As the rotating fan cools the air the expansible material in the thermally responsive unit 68 tends to contract thus permitting the compressed spring 86 to expand and thereby tend to move the lever 65 in a counterclockwise direction relative to the plate 66. This counterclockwise torque exerted on the lever 65 tends to free the trailing end 62 of the clutching element 16 from engagement with the clutching surface 40. This torque builds up progressively as the thermally expansible material in the unit 68 contracts and offers less resistance to the piston 80 being moved to the left as viewed in FIG. 2. During clockwise movement of the lever 65 a rather substantial amount of energy is stored up in the spring 86. Therefore, once disengaging action begins as the air around the unit is cooled, a complete disengagement takes place with rather positive action. The disengaging feature of a unit of this type has been found to operate extremely well when a force of approximately 20 lbs. is stored up in the spring in order to assure a quick and positive disengagement at the desired time against the centrifugal force tending to keep the clutching element engaged with the clutching surface 40 of the driving member 10. It is extremely desirable that a positive disengaging action be achieved at a predetermined lower range of temperatures. Such positive disengagement is effected without substantial slippage.

It can be seen that this device advantageously provides a simply constructed thermally actuated clutching mechanism for engaging and disengaging an automobile engine cooling fan in response to varying temperature conditions. This device advantageously allows a cooling fan to remain in a disengaged position at relatively low engine operating temperatures when excess cooling would not be desirable, and it also provides for engagement of the fan when such cooling effects eventually are required.

It should also be pointed out that while the embodiment here described has been described in relation to an automotive environment, such a clutching device may be used in a variety of other environments where selective engagement and disengagement of a driven device are desired.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

We claim:

1. A clutch mechanism comprising: a driving member; a driven member; a clutching element mounted on said driven member for drivingly connecting said driving and driven members; actuating means mounted on said driven member for urging said clutching element into position to drivingly connect said driving and driven members, said actuating means comprising a lever pivotally mounted substantially at the center of said driven member, means operably connecting said lever with said clutching element, temperature responsive means mounted on said driven member and operably connected with said lever to move said lever about its pivotal mounting and thereby effect engagement of said clutching element with said driving member.

2. A clutch mechanism comprising: a driving member; a driven member; a clutching element mounted on said driven member for drivingly connecting said driving and driven members; actuating means mounted on said driven member for urging said clutching element into position to drivingly connect said driving and driven members, said actuating means comprising a lever pivotally mounted substantially at the center of said driven member, means operably connecting said lever with said clutching element, temperature responsive means mounted on said driven member and operably connected with said lever to move said lever about its pivotal mounting and thereby effect engagement of said clutching element with said driving member and biasing means mounted on said driven member and operably connected to said lever for urging said clutching element out of engagement with said driving member.

3. A clutch mechanism comprising: a driving member; a driven member; a clutching element mounted on said driven member for drivingly connecting said driving and driven members; actuating means mounted on said driven member for urging said clutching element into position to drivingly connect said driving and driven members, said actuating means comprising a lever pivotally mounted substantially at the center of said driven member, means operably connecting said lever with said clutching element, temperature responsive means mounted on said driven member and operably connected with said lever to move said lever about its pivotal mounting and thereby effect engagement of said clutching element with said driving member, and weight means connected to said clutching element and responsive to centrifugal force to assist said clutching element in maintaining driving engagement with said driving member.

4. A clutch mechanism comprising: a driving member; a driven member; a clutching element mounted on said driven member for drivingly connecting said driving and driven members; actuating means mounted on said driven member for urging said clutching element into position to drivingly connect said driving and driven members, said actuating means comprising a lever pivotally mounted substantially at the center of said driven member, means operably connecting said lever with said clutching element, temperature responsive means mounted on said driven member and operably connected with said lever to move said lever about its pivotal mounting and thereby effect engagement of said clutching element with said driving member, biasing means mounted on said driven member and operably connected to said lever for urging said clutching element out of engagement with said driving member, and weight means connected to said clutching element and responsive to centrifugal force to assist said clutching element in maintaining driving engagement with said driving member.

5. A clutching mechanism comprising: a driving means with an annular drum portion having friction means on the inner periphery of said drum portion; a freely rotatable driven member located radially inward of said drum portion; a clutching element on the outer periphery of said driven member and expandable to engage the friction means of said drum portion whereby driving engagement between the driving and driven member is obtained, said clutching element comprising an expandable metal band with friction means thereon having one end thereof held against circumferential movement with respect to the driven member and the other end thereof free to move circumferentially and radially; means operable to actuate said clutching element by moving the free end of said clutching element whereby the clutching element is expanded into driving engagement with the friction means on the said drum, and likewise operable to retract the clutching element by circumferential movement of the latter in the opposite direction whereby the clutching element is disengaged from contact with the friction element on said drum; said means for moving said clutching element circumferentially comprising a lever centered at one end for arcuate movement about the center of said driven member, and operatively engaged at its other end with the free end of said clutching element, temperature responsive means operative in response to a pre-determined increase in temperature to effect engagement of the clutching element of the driven member with the driving means by biasing the lever means whereby the clutching element is expanded into engaged position, weight means attached to the free end of said clutching element and responsive, subsequent to engagement of the clutching element to assist said clutching element in maintaining driving engagement with the driving means, and biasing means operative to move said lever means and thereby cause the free end of said clutching element to assume a disengaged position when the predetermined temperature at which said thermally responsive means causes engagement drops below the said pre-determined amount.

References Cited in the file of this patent

UNITED STATES PATENTS

| | | |
|---|---|---|
| 2,005,350 | Rickwood | June 18, 1935 |
| 2,652,816 | Dodge | Sept. 22, 1953 |
| 2,658,400 | Dodge | Nov. 10, 1953 |
| 2,811,956 | Lauck | Nov. 5, 1957 |